No. 859,759. PATENTED JULY 9, 1907.
A. W. GETCHELL.
VEHICLE TIRE.
APPLICATION FILED SEPT. 6, 1906.

Witnesses
Geo. B. Tibbitts
E. A. Tibbitts

Augustus W. Getchell Inventor
By Attorney Geo. W. Tibbitts

UNITED STATES PATENT OFFICE.

AUGUSTUS W. GETCHELL, OF CLEVELAND, OHIO.

VEHICLE-TIRE.

No. 859,759.  Specification of Letters Patent.  Patented July 9, 1907.

Application filed September 6, 1906. Serial No. 333,438.

*To all whom it may concern:*

Be it known that I, AUGUSTUS W. GETCHELL, a citizen of the United States of America, and à resident of Cleveland, Cuyahoga county, State of Ohio, have invented certain new and useful Improvements in Vehicle-Tires, of which the following is a specification.

This invention relates to improvements in vehicle tires, and has for its object to provide a means for preventing the total collapse of the tire in case of a puncture, whereby the rider is enabled, without further injury to the pneumatic tire, to pursue his way home or to a garage to repair the defect.

The invention consists in providing the wheel with an additional tire attached to the side of the wheel on the side next to the body, to form an auxiliary bearing, to take the weight off from the punctured tire, which without this would soon completely collapse and cut the tire on the edge of the rim and cause its complete ruin, and cause it to fly off and greatly endanger the lives of the occupants of the vehicle.

Figure 1:
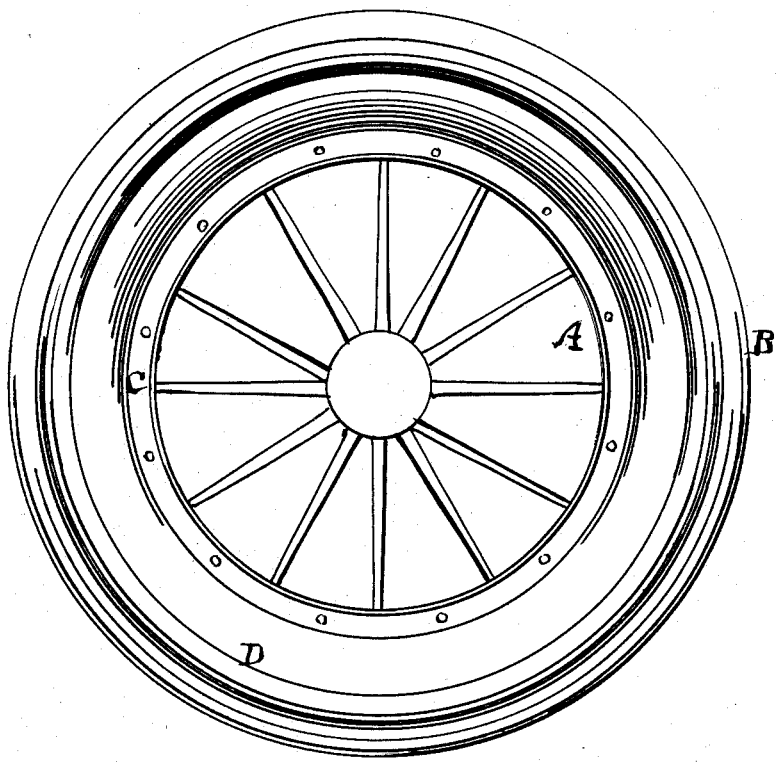
Figure 2:
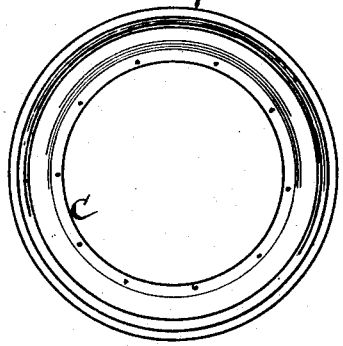
Figure 3:
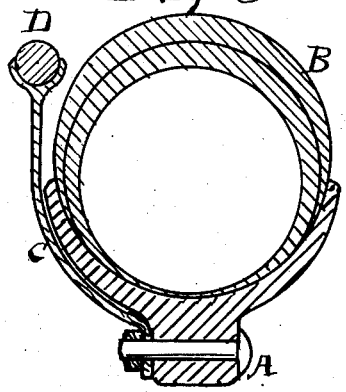

In the accompanying drawings:—Figure 1 is a side elevation of a wheel having my improvement attached. Fig. 2 is a detached view of the plate and additional tire. Fig. 3 is a cross section of the tire showing my additional relief tire.

A represents the felly of the wheel.

B is the pneumatic tire.

C is a circular plate formed to fit on the side of the wheel and is bolted on or it may be cast or formed on the wheel when it is first made and be an integral part thereof. This plate extends outward to within about one inch of the outer diameter of the pneumatic tire, and has a double flange to hold a solid rubber tire D.

By the use of this relief tire a total collapse is avoided and the danger of the reduction of the wheel is also avoided, which would greatly endanger the occupants to fatal accidents.

What I claim is:

In combination with the felly of a vehicle wheel having a pneumatic tire, a single integral annular plate formed at its inner portion with a narrow flat portion and having its remaining portion arcuate in cross section, a double flange at the periphery of said arcuate portion, a tire secured in said double flange, said flat portion of the plate abutting the side of said wheel, and bolts passing transversely through said wheel and said flat portion of the plate, said arcuate portion of the plate being shaped to lie closely to the adjacent portion of the felly.

Signed by me at Cleveland, Ohio, this 1 day of August, 1906.

AUGUSTUS W. GETCHELL.

Witnesses:
GEO. W. TIBBITTS,
MARY A. WARE.